US009329984B2

United States Patent
Dhangar et al.

(10) Patent No.: US 9,329,984 B2
(45) Date of Patent: May 3, 2016

(54) METHODS AND SYSTEMS FOR MONITORING AND LOGGING SOFTWARE AND HARDWARE FAILURES

(71) Applicant: Nvidia Corporation, Santa Clara, CA (US)

(72) Inventors: Nitin Dhangar, Pune (IN); Harsha Kumar, Pune (IN); Shashikant Jadhav, Pune (IN)

(73) Assignee: Nvidia Corporation, Santa Clara, CA (US)

( * ) Notice: Subject to any disclaimer, the term of this patent is extended or adjusted under 35 U.S.C. 154(b) by 126 days.

(21) Appl. No.: 14/162,685

(22) Filed: Jan. 23, 2014

(65) Prior Publication Data

US 2015/0205711 A1    Jul. 23, 2015

(51) Int. Cl.
*G06F 11/00* (2006.01)
*G06F 11/36* (2006.01)
*G06F 11/07* (2006.01)
*G06F 11/32* (2006.01)

(52) U.S. Cl.
CPC ........ *G06F 11/3692* (2013.01); *G06F 11/0709* (2013.01); *G06F 11/0748* (2013.01); *G06F 11/0766* (2013.01); *G06F 11/0784* (2013.01); *G06F 11/327* (2013.01)

(58) Field of Classification Search
CPC ............ G06F 11/0784; G06F 11/0709; G06F 11/0748; G06F 11/0766; G06F 11/327
See application file for complete search history.

(56) References Cited

U.S. PATENT DOCUMENTS

| 6,925,586 B1 * | 8/2005 | Perrella et al. ................... 714/57 |
| 7,266,726 B1 * | 9/2007 | Ladd et al. ....................... 714/27 |
| 2009/0019310 A1 * | 1/2009 | Nastacio et al. ................. 714/26 |
| 2009/0100411 A1 * | 4/2009 | Weiss ............................ 717/124 |

* cited by examiner

Primary Examiner — Charles Ehne

(57) ABSTRACT

Methods and systems monitor and log software and hardware failures (i.e. errors) over a communication network. In one embodiment, the method includes detecting an event caused by an error, and generating a log of the event in response to the detection. The method further includes generating a first message prompting if a user consents to allowing a third party provider track the error and transmitting the log to the third party provider over the communication network if the user consents to allowing the third party provider track the error. The method yet further includes generating a second message prompting if the user wants to provide additional information relating to the error. The method still further includes providing a user interface including an error reporting portal to the user if the user wants to provide additional information and transmitting the portal to the third party provider.

22 Claims, 3 Drawing Sheets

FIG. 4

METHODS AND SYSTEMS FOR MONITORING AND LOGGING SOFTWARE AND HARDWARE FAILURES

TECHNICAL FIELD

The present disclosure is directed, in general, to monitoring and logging software and hardware failures.

BACKGROUND

During installation and operation, failures may occur in software and hardware. For example, a failure (also referred to as an "error") may be caused by a driver fault or caused by a hardware defect. Software and hardware developers often analyze and interpret failures or errors in order to find the cause of the failures. By determining the cause of the failures, developers can provide necessary software updates or improved hardware designs.

To determine the cause of failures or errors, developers need certain information about the failures that they regard as essential. Unfortunately, developers often lack such information about the failures. Users experiencing failures typically do not provide such essential information to the developers. Consequently, developers trying to analyze and interpret the failures are often relegated to re-create failures and issues in-house. Also, it may be necessary for developers to contact users to obtain essential information about the failures.

SUMMARY

Various disclosed embodiments are directed to methods and systems for monitoring and logging errors over a communication network. By monitoring and logging errors, essential information relating to the errors is obtained.

In one embodiment, the method includes detecting an event caused by an error, and generating a log of the event in response to the detection. The method further includes generating a first message prompting if a user consents to allowing a third party provider to track the error and transmitting the log to the third party provider over the communication network if the user consents to allowing the third party provider to track the error.

According to various disclosed embodiments, the method includes generating a second message prompting if the user wants to provide additional information relating to the error. The method includes providing a user interface including an error reporting portal to the user if the user wants to provide additional information relating to the error. The method includes receiving the additional information relating to the error on the portal and transmitting the portal to the third party provider over the communication network.

According to various disclosed embodiments, the method includes encrypting the log if the user consents to allowing the third party provider to track the error. The method includes generating a log identification and an error code associated with the error, and transmitting the log with the log identification and the error code to the third party provider over the communication network.

According to various disclosed embodiments, The method includes deleting the log if the user declines to allow the third party provider to track the error.

According to various disclosed embodiments, the error reporting portal includes a voice recorder configured to record a voice message. The error reporting portal includes a diagnostic button to enable a user to run diagnostics relating to the error and to log detailed information relating to the error.

According to various disclosed embodiments, a non-transitory computer-readable medium encoded with computer-executable instructions monitors and logs errors over a communication network. The computer-executable instructions when executed cause at least one data processing system to: detect an event and generate a log of the event in response to the detection; transmit the log to a third party provider over the communication network; provide a user interface including an error reporting portal for receiving additional information relating to the error; and transmit the error reporting portal to the third party provider over the communication network.

BRIEF DESCRIPTION

Reference is now made to the following descriptions taken in conjunction with the accompanying drawings, in which:

FIG. 4 illustrates an error reporting portal according to various disclosed embodiments.

DETAILED DESCRIPTION

FIGS. 1-4, discussed below, and the various embodiments used to describe the principles of the present disclosure are by way of illustration only and should not be construed in any way to limit the scope of the disclosure. Those skilled in the art will recognize that the principles of the disclosure may be implemented in any suitably arranged device or a system. The numerous innovative teachings of the present disclosure will be described with reference to exemplary non-limiting embodiments Various disclosed embodiments are directed to methods and systems for monitoring and logging errors over a communication network. By monitoring and logging errors, essential information relating to the errors is obtained.

Figure 1:
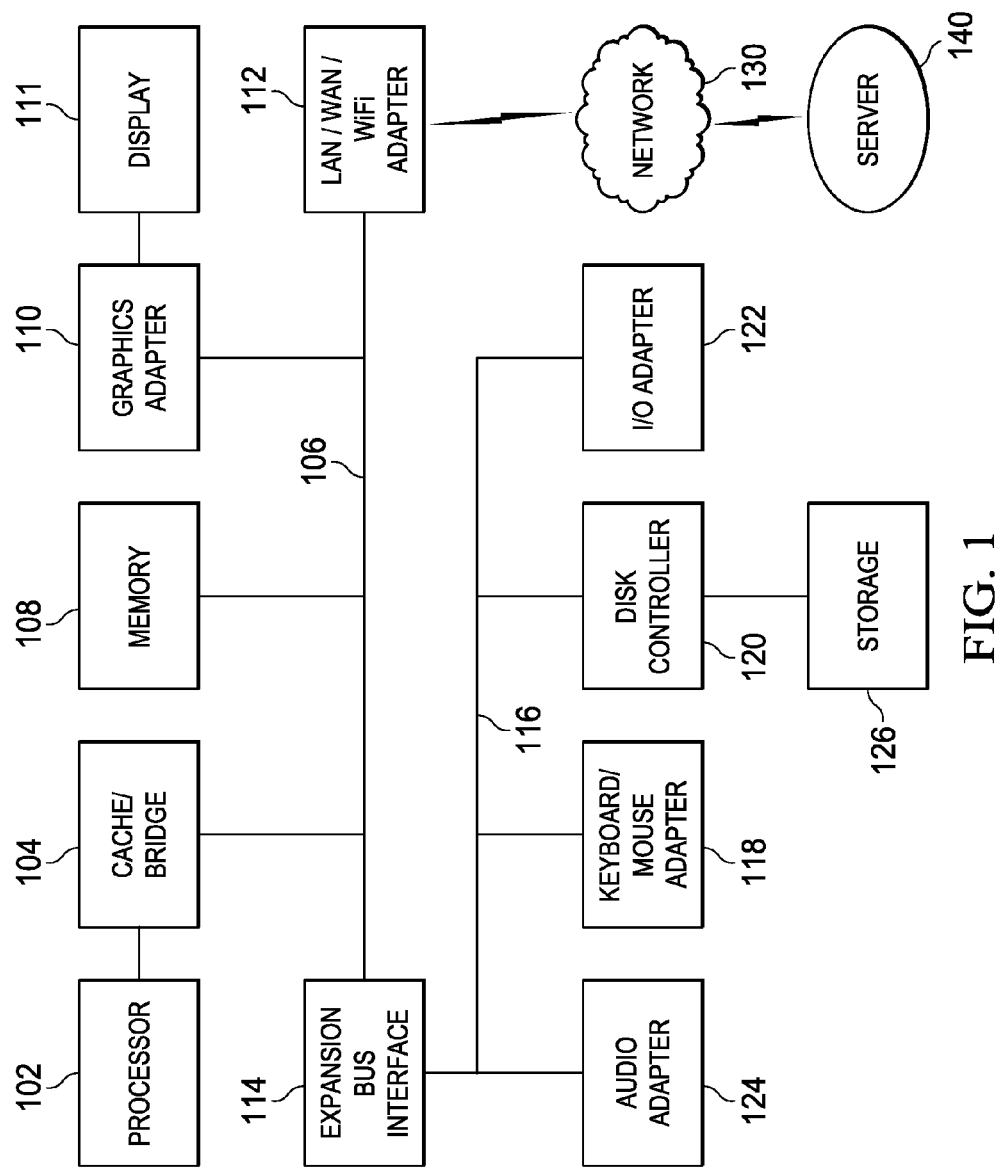
FIG. 1 illustrates a block diagram of a data processing system according to various disclosed embodiments.

FIG. 1 depicts a block diagram of data processing system 100 in which an embodiment can be implemented, for example, as a system particularly configured by software, hardware or firmware to perform the processes as described herein, and in particular as each one of a plurality of interconnected and communicating systems as described herein. Data processing system 100 may be implemented for monitoring and logging driver faults over a communication network.

Referring to FIG. 1, the data processing system depicted includes processor 102 connected to level two cache/bridge 104, which is connected in turn to local system bus 106. Local system bus 106 may be, for example, a peripheral component interconnect (PCI) architecture bus. Also connected to local system bus in the depicted example are main memory 108 and graphics adapter 110. Graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

Data processing system 100 in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

LAN/WAN/Wireless adapter 112 can be connected to network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. Data processing system 100 may be configured as a workstation, and a plurality of similar workstations may be linked via a communication network to form a distributed system in accordance with embodiments of the disclosure.

Figure 2:
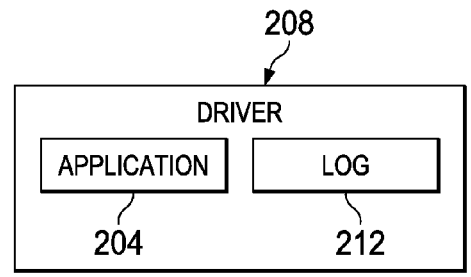
FIG. 2 illustrates a block diagram of an application according to various disclosed embodiments.

FIG. 2 illustrates an exemplary block diagram of application 204 according to various disclosed embodiments. Application 204 comprises computer executable instructions for monitoring and logging errors (also referred to as "failures") over a communication network. By monitoring and logging errors, essential information relating to the errors is obtained.

Application 204 may be implemented as a logging tool embedded in driver 208. The logging tool is configured to detect an event which may be an error or a failure in software or hardware. Application 204 generates log 212 of the event, which may be transmitted to a third party service provider or a manufacturer over a communication network such as, for example, the Internet. The generated logs may be encrypted to maintain confidentiality of the related information.

Figure 3:
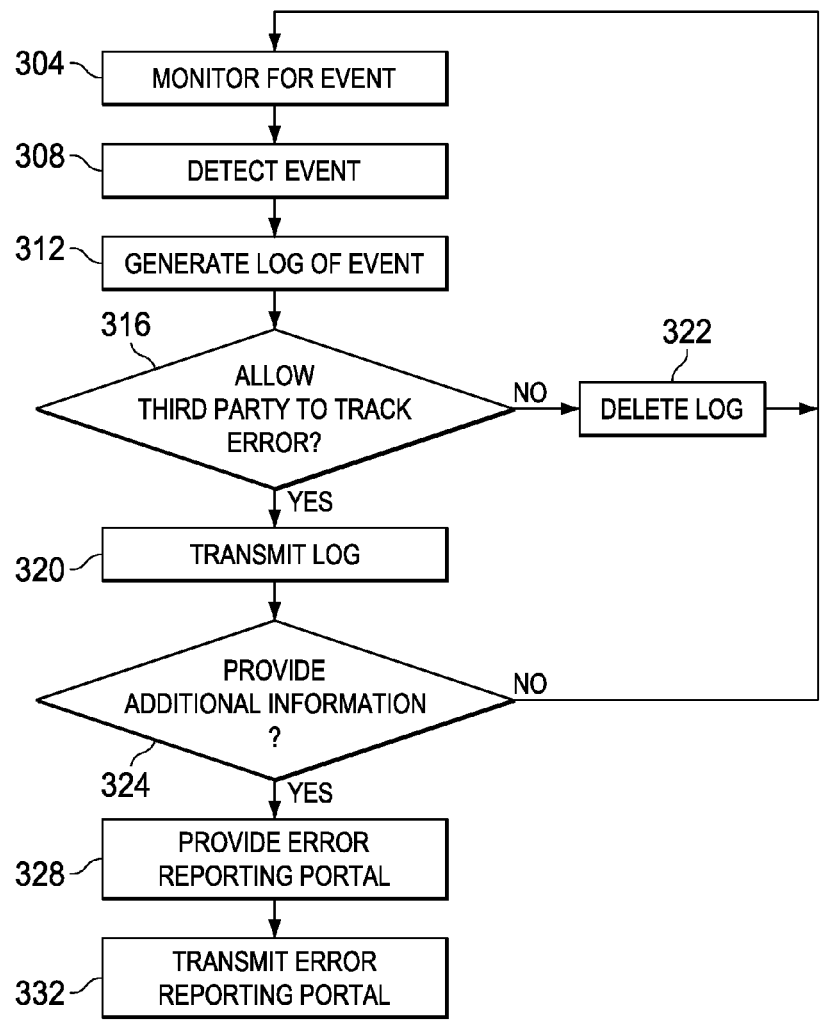
FIG. 3 is a flowchart of a process according to various disclosed embodiments.

FIG. 3 is a flowchart of a process according to various disclosed embodiments. Such a process can be performed, for example, by application 204 configured to monitor and log errors over a communication network, as described above, but the process can be performed by any apparatus configured to perform a process as described.

In block 304, application 204 monitors an operating system or applications for any event. The event may be an error caused by a driver fault.

In block 308, an event is detected by application 204. In block 312, a log is generated by application 204 in response to the detection. The log records information relating to the event.

In decision block 316, a user is prompted if a third party provider may be allowed to track the error. For example, a message may be generated which seeks the user's consent to allow a third party provider to track the error. The third party provider may be a service provider or a software or hardware developer interested in monitoring errors and obtaining essential information relating to the errors so that software updates or fixes may be provided.

If the user consents to allowing the third party provider to track the error, in block 320 the log is transmitted to the third party provider over a communication network (e.g., Internet). If the user declines to allow the third party provider to track the error, in block 322 the log is deleted and the flow returns to block 304 where application 204 continues to monitor for events.

In block 324, a second message is generated prompting if the user wants to provide additional information relating to the error. If the user wants to provide additional information, in block 328 a user interface including an error reporting portal is provided to the user. The user can provide additional information relating to the error on the portal. In block 332, the portal is transmitted to the third party provider over the communication network. If the user declines to provide additional information, the flow returns to block 304.

According to various disclosed embodiments, the log may be encrypted to maintain confidentiality of the information.

According to various disclosed embodiments, a log-identification and one or more error codes associated with the driver fault may be generated and transmitted with the log. The error codes are enumerated messages that correspond to errors in, for example, software or driver applications. The error codes may be used to identify faulty hardware and software.

According to various disclosed embodiments, the user's email address and other contact information may be included on the error reporting portal to allow the third party provider to contact the user, if necessary.

Figure 4:
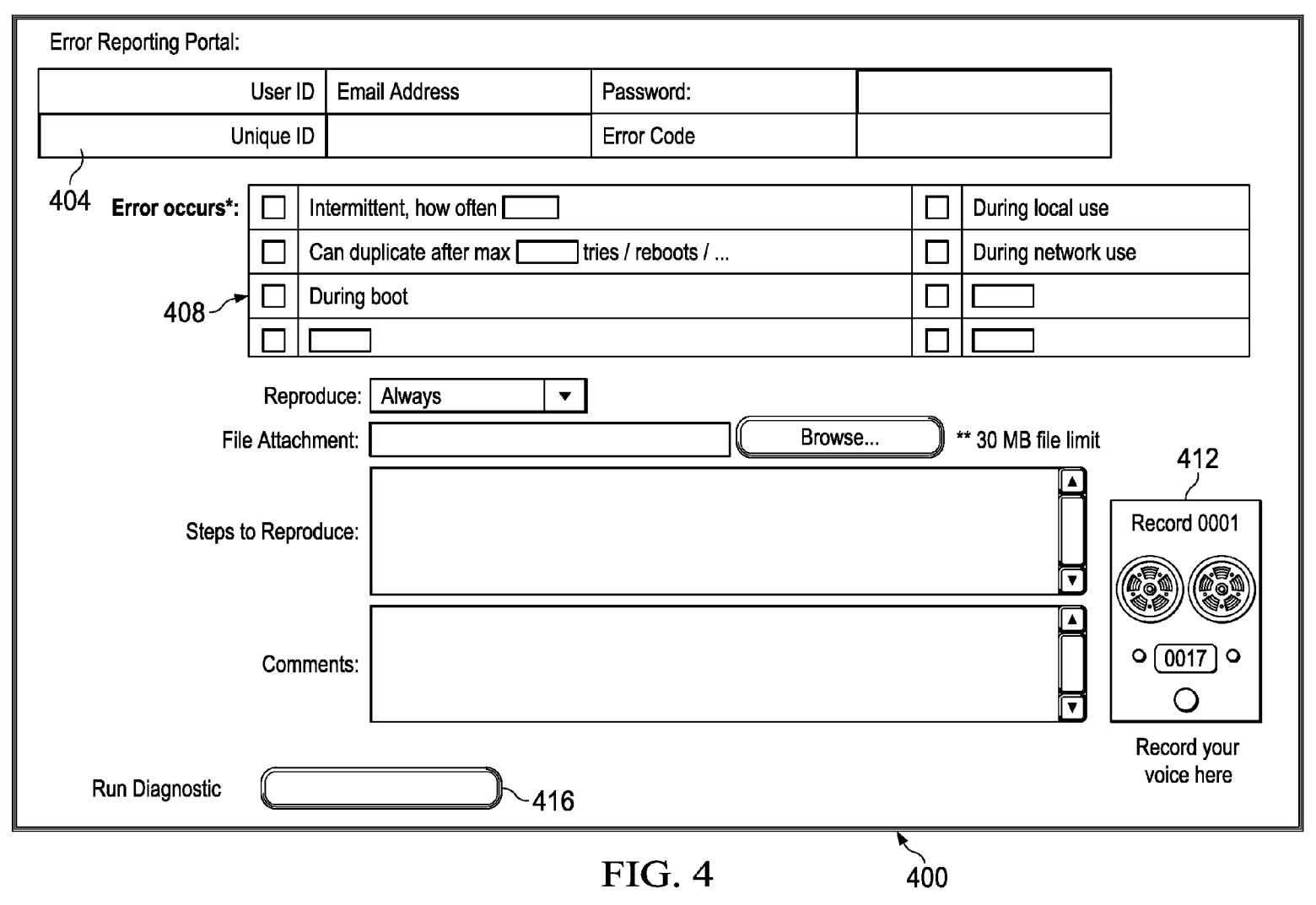

FIG. 4 illustrates an exemplary error reporting portal 400 according to various disclosed embodiments. Portal 400 includes field 404 designated for user ID, email address, password, error codes and other relevant information. The user may check one of several boxes on field 408 indicating the frequency of the errors. Portal 400 may include button 412 which enables the user to record a voice message explaining the error. Portal 400 may include diagnostic button 416 which allows the user to run diagnostics relating to the driver fault. The result of the diagnostic will be transmitted with portal 400 to the third party provider.

According to some disclosed embodiments, a non-transitory computer-readable medium encoded with computer-executable instructions monitors and logs errors over a communication network. The computer-executable instructions when executed cause at least one data processing system to: detect an event caused by an error; generate a log of the event in response to the detection; transmit the log to a third party provider over the communication network; provide a user interface including an error reporting portal for receiving additional information relating to the driver fault; and transmit the portal to the third party provider over the communication network.

Those skilled in the art will recognize that, for simplicity and clarity, the full structure and operation of all systems suitable for use with the present disclosure is not being depicted or described herein. Instead, only so much of a system as is unique to the present disclosure or necessary for an understanding of the present disclosure is depicted and described. The remainder of the construction and operation of the disclosed systems may conform to any of the various current implementations and practices known in the art.

Of course, those of skill in the art will recognize that, unless specifically indicated or required by the sequence of operations, certain steps in the processes described above may be omitted, performed concurrently or sequentially, or performed in a different order. Further, no component, element, or process should be considered essential to any specific claimed embodiment, and each of the components, elements, or processes can be combined in still other embodiments.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Those skilled in the art to which this application relates will appreciate that other and further additions, deletions, substitutions and modifications may be made to the described embodiments.

What is claimed is:

1. A method for monitoring and logging errors over a communication network, comprising:
    detecting an event caused by an error;
    generating a log of the event in response to the detection;
    generating a first message prompting if a user consents to allowing a third party provider track the error;
    transmitting the log to the third party provider over the communication network if the user consents to allowing the third party provider track the error; and
    deleting the log if the user declines to allow the third party provider to track the error.

2. The method of claim 1, further comprising:
    encrypting the log if the user consents to allowing the third party provider track the error;
    generating a log identification and an error code associated with the error; and
    transmitting the log with the log identification and the error code to the third party provider over the communication network.

3. The method of claim 1, further comprising
    generating a second message prompting if the user wants to provide additional information relating to the error;
    providing a user interface including an error reporting portal to the user if the user wants to provide additional information relating to the error;
    receiving the additional information relating to the error on the error reporting portal; and
    transmitting the additional information from the error reporting portal to the third party provider over the communication network.

4. The method of claim 1, wherein the event is an error in an operating system or an application caused by a driver fault.

5. The method of claim 1, further comprising including the user's email address on the portal.

6. The method of claim 1, wherein the event is detected by a logging tool embedded in a driver.

7. The method of claim 1, wherein the logging tool is encrypted.

8. The method of claim 1, wherein the portal includes a voice recorder configured to record a voice message.

9. The method of claim 1, wherein the portal includes a diagnostic button to enable a user to run diagnostics relating to the error and to log detailed information relating to the error.

10. A method for monitoring and logging errors over a communication network, comprising:
    detecting, by an encrypted logging tool embedded in a driver, an event caused by an error;
    generating a log of the event in response to the detection;
    transmitting the log to a third party provider over the communication network; and
    providing additional information relating to the error through a user interface including an error reporting portal.

11. The method of claim 10, further comprising:
    encrypting the log;
    generating a log identification and an error code associated with the error; and
    transmitting the log with the log identification and the error code to the third party provider over the communication network.

12. The method of claim 10, wherein the event is an error in an operating system or an application caused by a driver fault.

13. The method of claim 10, further comprising transmitting the error reporting portal to the third party provider over the communication network.

14. The method of claim 10 further comprising deleting the log if the user declines to allow the third party provider to track the error.

15. The method of claim 10, further comprising:
    generating a first message prompting if a user consents to allowing the third party provider track the error; and
    transmitting the log to the third party provider over the communication network if the user consents to allowing the third party provider track the error.

16. The method of claim 11, further comprising:
    generating a second message prompting if the user wants to provide the additional information relating to the error; and
    providing the user interface including the error reporting portal to the user if the user wants to provide the additional information relating to the error.

17. A non-transitory computer-readable medium encoded with computer-executable instructions for monitoring and logging errors over a communication network, wherein the computer-executable instructions when executed cause at least one data processing system to:
    detect an event and generate a log of the event in response to the detection;
    transmit the log to a third party provider over the communication network; and
    provide a user interface including an error reporting portal for receiving additional information relating to the error, wherein the error reporting portal includes a voice recorder configured to record a voice message.

18. The non-transitory computer-readable medium of claim 17, wherein the event is an error in an operating system or an application caused by a driver fault.

19. The non-transitory computer-readable medium of claim 17, wherein the event is detected by a logging tool embedded in a driver.

20. The non-transitory computer-readable medium of claim 17, wherein the logging tool is encrypted.

21. The non-transitory computer-readable medium of claim 17, further comprising transmit the error reporting portal additional information to the third party provider over the communication network.

22. The non-transitory computer-readable medium of claim 17, wherein the error reporting portal includes a diagnostic button to enable a user to run diagnostics relating to the error and to log detailed information relating to the error.

* * * * *